United States Patent
Awada et al.

(10) Patent No.: US 6,873,861 B2
(45) Date of Patent: Mar. 29, 2005

(54) BUSINESS CARD PRESENTATION VIA MOBILE PHONE

(75) Inventors: Faisal M. Awada, Round Rock, TX (US); Joe Nathan Brown, Austin, TX (US); Minh Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/833,338

(22) Filed: Apr. 12, 2001

(65) Prior Publication Data

US 2002/0151326 A1 Oct. 17, 2002

(51) Int. Cl.[7] .............................................. H04M 1/00
(52) U.S. Cl. .................... 455/566; 455/566; 455/414.1; 455/411; 455/550.1; 455/433; 455/458; 345/784; 379/93.09
(58) Field of Search ............................ 455/566, 414.1, 455/411, 550.1, 433, 458, 517, 412.1; 345/784, 341; 379/93.09; 340/371

(56) References Cited

U.S. PATENT DOCUMENTS

| | | | | |
|---|---|---|---|---|
| 5,764,736 A | * | 6/1998 | Shachar et al. .......... | 379/93.09 |
| 5,923,327 A | * | 7/1999 | Smith et al. ................. | 345/784 |
| 6,175,741 B1 | * | 1/2001 | Alperovich .................. | 455/458 |
| 6,223,035 B1 | * | 4/2001 | Pierce et al. ................. | 455/433 |
| 6,601,111 B1 | * | 7/2003 | Peacock et al. ............. | 719/310 |
| 6,717,686 B1 | * | 4/2004 | Farros et al. ................. | 358/1.1 |
| 6,816,725 B1 | * | 11/2004 | Lemke et al. ............. | 455/414.1 |
| 2001/0044324 A1 | * | 11/2001 | Carayiannis et al. ........ | 455/564 |
| 2002/0065065 A1 | * | 5/2002 | Lunsford et al. ........... | 455/411 |
| 2002/0077082 A1 | * | 6/2002 | Cruickshank ............... | 455/413 |
| 2002/0094777 A1 | * | 7/2002 | Cannon et al. ............... | 455/41 |

* cited by examiner

Primary Examiner—Lester G. Kincaid
Assistant Examiner—Khai Nguyen
(74) Attorney, Agent, or Firm—Volel Emile; Diana R. Gerhardt; Dillon & Yudell LLP

(57) ABSTRACT

A method for providing an electronic business card to a contact via a cellular phone is disclosed. Several business card menu options are provided to a user of a cellular telephone. The cellular phone user enters business card information/data into the cellular phone utilizing the business card menu options. The business card data is stored locally on the cellular phone or in a service provider database. When the user is in communication via cellular phone with someone he wishes to provide his business card to, the user selects a menu item that activates the transmission of the electronic business card to the desired recipient's cellular phone.

27 Claims, 5 Drawing Sheets

BUSINESS CARD PRESENTATION VIA MOBILE PHONE

BACKGROUND OF THE INVENTION

1. Technical Field

The present invention relates in general to cellular telephones, and in particular to user features of cellular telephones. Still more particularly, the present invention relates to a method and system for storing and providing electronic business cards to another cellular telephone user.

2. Description of the Related Art

The utilization of cellular telephones (cell phones) is becoming increasingly popular in today's wireless environment. Cellular phone service is provided for both business use and personal use via individual cellular phones, which connect to particular cellular service providers, such as Sprint and GTE.

The popularity of cellular phones has led to growing desire for improvements in available features (both hardware and software) for user satisfaction. The major improvements have included the creation of light-weight phones and inclusion of advanced features, such as web access, call waiting, caller ID, time display, etc. Some of these features are provided as a menu option that may be enabled or disabled, i.e., turned on or off, by the user.

The convenience of utilizing cellular phones to conduct business, particularly when the user is outside of a "traditional" office setting is very important reason for the fast expansion of cellular phone use. An individual is able to keep in touch with his office and with other business contacts—old and new—while outside of his office.

Typically, when a new contact is made, either business or personal, the preferred method of providing business contact information is with a business card. When a person desires to give a customer or client a business card, the card must be physically presented to the recipient. Providing a potential customer or client with a business card allows the business person to establish a "foothold" with a customer in a professional manner.

In today's global business environment, with the wide proliferation of cell phones and the frequency with which business is conducted over these cellular phones, a large number of business contacts are made over the cellular phones. Consequently, a business person is often not in the physical presence of his new contact (customer or client) and thus, when conducting business via a cellular phone, the business person is unable to immediately present a business card to the contact. Therefore, the business person has to resort to mailing the business card to the contact or providing his contact information verbally over the cellular phone. This mode of establishing new business contacts is not desirable, since it involves extra steps to get the business card to the contact and/or forces the contact to have to write the information down on a sheet of paper. Additionally, since the first impression is the one which ultimately determines if the potential customer or client in fact becomes a customer/client, providing that professionally done business card with all required contact information goes a long way in appealing to the sense of professionalism.

With present cellular phone design, caller ID information is provided to a call recipient when a call is received on the recipient's cellular phone. The identified number may then be stored on the recipient's phone. However, this information is often limited to the caller's number, and the caller's name is often not provided for the recipient to recognize this number for later contact, the call recipient has to manually enter the remaining data that may be relevant, such as the caller's name and address, etc. Further, it is usually the person from whom the call originates, who wishes the recipient to have the information readily available for a later contact.

The present invention recognizes that it would be desirable to be able to immediately provide remotely-contacted customers or clients with a business card. A method and system by which a user communicating via a cellular phone can electronically transmit a business card via his cellular telephone to a contact's cellular phone would be a welcomed improvement. These and other benefits are provided by the invention described herein.

SUMMARY OF THE INVENTION

A method for providing an electronic business card to a contact via a cellular phone is disclosed. Several business card menu options are provided to a user of a cellular telephone. The cellular phone user enters business card information/data into the cellular phone utilizing the business card menu options and cellular phone keypad. The business card data is stored locally on the cellular phone or in a database maintained by the service provider. When the user is in communication via cellular phone with someone he wishes to provide his business card to, the user selects a menu item that activates the transmission of the electronic business card to the desired recipient's cellular phone.

When the desired recipient has received the business card, an alert is provided to the recipient, who may then save the card on his cellular phone or at the service provider's database, if available. The user is thus able to directly provide his business card to the recipient without being in physical presence of the recipient. In one embodiment, the recipient may actually transmit an electronic request for the business card and the user responds to the request by transmitting the card.

Once the data of a business card is stored, the user/recipient is able to access the card data and/or initiate a call to the phone number on the card as a selectable menu option. In advanced cellular phones, having email capability, the user may also create and transmit an email to the email address located on the electronic business card as a selectable menu option.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
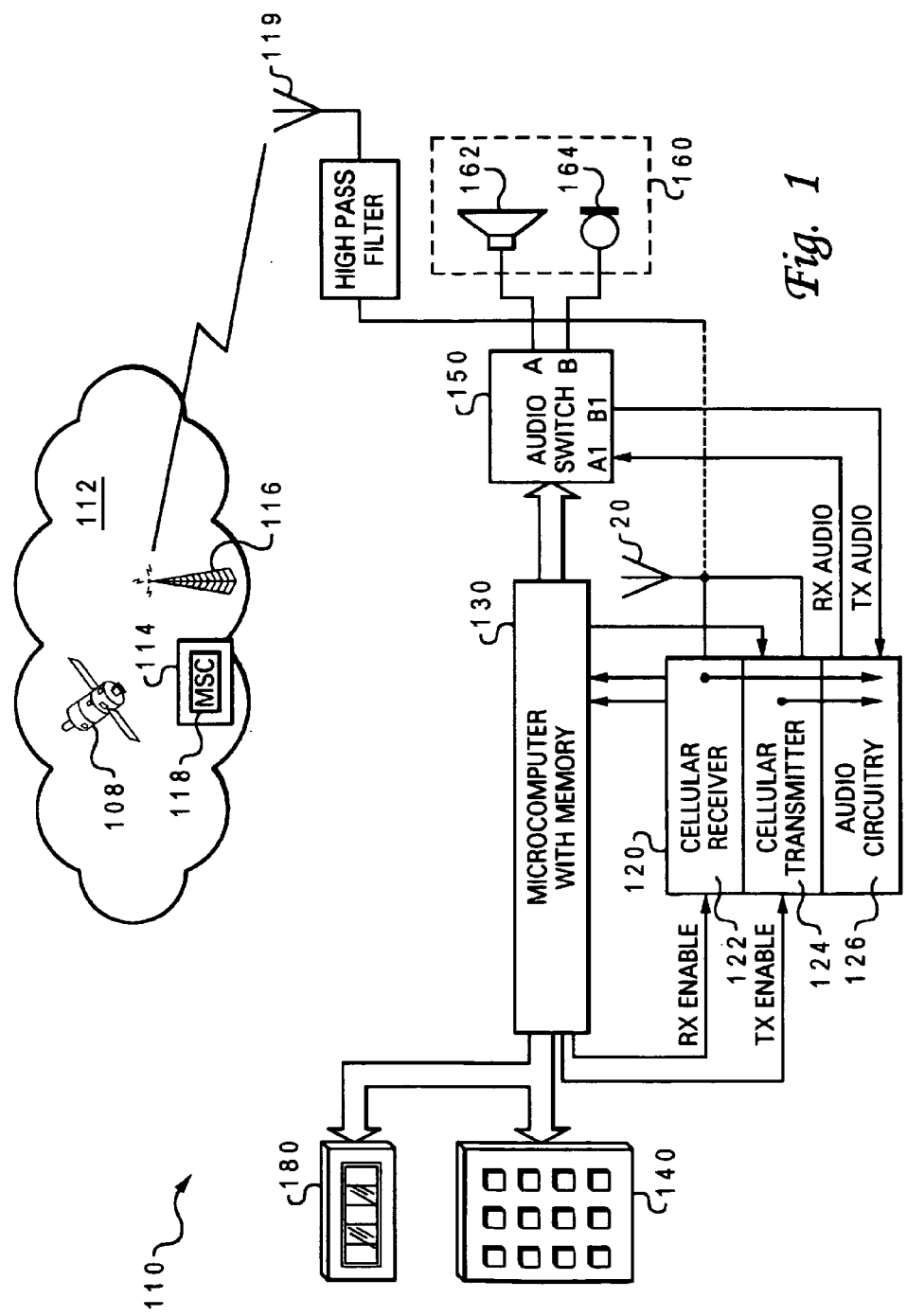
FIG. 1 illustrates a block diagram of component parts of a cellular telephone system in which a preferred embodiment of the present invention may be implemented.

With reference now to the figures and in particular with reference to FIG. 1, there is depicted a block diagram of component parts of a cellular telephone 110 in which a preferred embodiment of the present invention may be implemented. Those skilled in the art will appreciate that other types of wireless telephone systems may be utilized in accordance with a preferred embodiment of the present invention and that cellular telephone 110 as described herein is only one such embodiment that is presented for illustrative purposes only. Cellular telephone 110 communicates with a service provider via cellular network 112 that typically includes base station 114 having base station antenna 116 and mobile switching center (MSC) 118. MSC 118 is a switch that provides services and coordination between mobile wireless telephone users in a cellular network 112 and other external networks. MSC 118 controls system operations in analog and digital cellular networks. For example, MSC 118 controls calls, tracks billing information, and locates wireless subscribers. In one embodiment, service provider also provides a database 108 within cellular network 112 at which each cellular phone subscriber is permitted to store electronic business cards, including cards entered on the subscriber's cellular phone and cards received from other cellular phone user's, as described further below.

Cellular phone 110 includes antenna 119 for transmitting and receiving signals over wireless radio channels. Cellular phone 110 also includes wireless telephone transceiver 120, (which comprises receiver 122, transmitter 124 and audio circuitry 126) microcomputer 130, keypad 140, display 180, audio switch 150, and audio interface 160, including speaker 162 and microphone 164. Microcomputer 130 is a computer built around a single chip microprocessor. Less powerful than minicomputers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular phone 110. Microcomputer 130 further includes memory component (not shown) in which business card data, inputted by the user or received on cellular phone 110, may be stored. Memory component is preferably a non-volatile memory component, which also stores program code required for the operation of cellular phone 110, and program code for providing the various features of the present invention, such as displaying selectable menu items and receiving user entered business card data.

Display 180 can be any type of display device which visually presents data to a cellular telephone user. Display devices such as a liquid crystal display or a plasma display can be utilized to implement display 180. Display 180, when utilized in the present invention, preferably provides clear textual and/or graphical representations such that scaled, visible output of a business card is clearly legible to a user.

Keypad 140 comprises a set of keys or depressible buttons that are mounted on a small keyboard and are dedicated to a specific purpose, such as receiving numerical input or menu option selection. Keypad 140 is preferably modeled after the standard telephone keypad. The architecture and control of the illustrated cellular phone is for illustrative purposes only and should not be utilized to limit the scope of the present invention.

Figure 2:
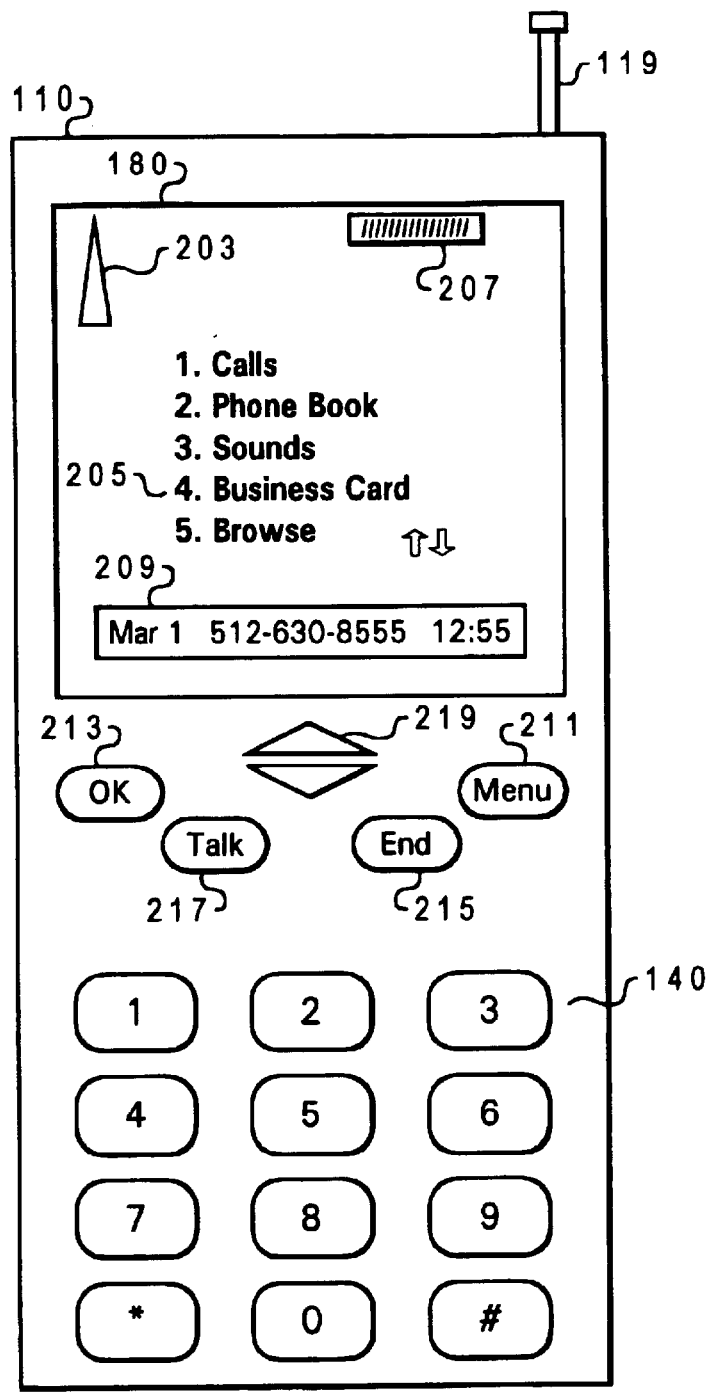
FIG. 2 depicts a frontal view of a cellular telephone in accordance with one embodiment of the present invention.

FIG. 2 illustrates one embodiment of a frontal view of an assembled cellular phone 110 with display screen and selectable option buttons (keypad 140 and other functional buttons). Display screen 180 of cellular phone 110 displays general menu with selectable menu item 4, "Business Card" 205. Also visible on display screen 180 are battery power icon 207, greeting bar 209 with date, cell number, and time stamp, and signal icon 203. Cellular phone 110 also includes alphanumeric keypad 140, menu button 211, OK button 213, end button 215, and talk button 217. Also included are up and down scroll buttons 219 by which the user may scroll through the various menu items and input-requesting options to provide the functional features of the invention. Cellular phone 110 may also include various other components. However these additional components are not necessary for the description of the invention and not provided herein.

As illustrated in FIG. 2, the present invention adds at least one menu item, Business Card 205, to the general menu content available on cellular telephone 110. The invention further provides a method by which the entered Business Card may be transmitted to a business or personal contact via cellular phone 110.

The invention allows a user communicating over a cellular telephone to instantaneously present a business card to someone (e.g., client or a customer) without having to be in the physical presence of that person. The inventor also allows a user to access a stored business card from his mobile phone and dial the number listed on the business card or, in one embodiment, transmit an email to the email address on the business card.

In the preferred embodiment, an electronic representation of a business card is stored in the non-volatile memory of the cellular phone. The user's business card is initially created on the cellular phone using designated menu functions which allow entry of the data constituting the business card. The business card data that is stored may consist of but is not limited to: (1) Business Name; (2) Contact Name; (3) Address; (4) Telephone Number; (5) Fax Number; (6) Email Address; and (7) Business Web Address.

Once the business card data has been stored, it may be transmitted to a customer/client by accessing the menu function designated for that purpose. When this menu function is invoked, the business card data is encoded by the cellular phone and transmitted over the cellular network to the party or parties engaged in the phone call. When the data is received it is stored utilizing menu functions on the recipient's cellular phone (subject to acceptance by the recipient). The business card can then be viewed on the display of the recipient's cellular phone. Business cards can be retained in the cellular phone or downloaded from the cellular phone to a specific mailbox, which is dedicated for storing business card-type data. The mailbox is preferably a database location provided by the service provider to the cellular phone user. When the business card is downloaded, the cellular phone will retain only a link (business name or contact's name) to the business card, thus freeing up the memory of the cellular phone. When access to a downloaded business card is needed, the user simply selects the link and then selects a "Get Business Card" menu function. The cellular phone then connects with the mailbox, which transmits the selected business card to the mobile phone for viewing. A phone call can be placed to the number shown on the business card by selecting the business card and pressing the phone's dial function. With voice activated dialing, the user may simply say "CALL" when the business card is being displayed to initiate the call.

Figure 3:
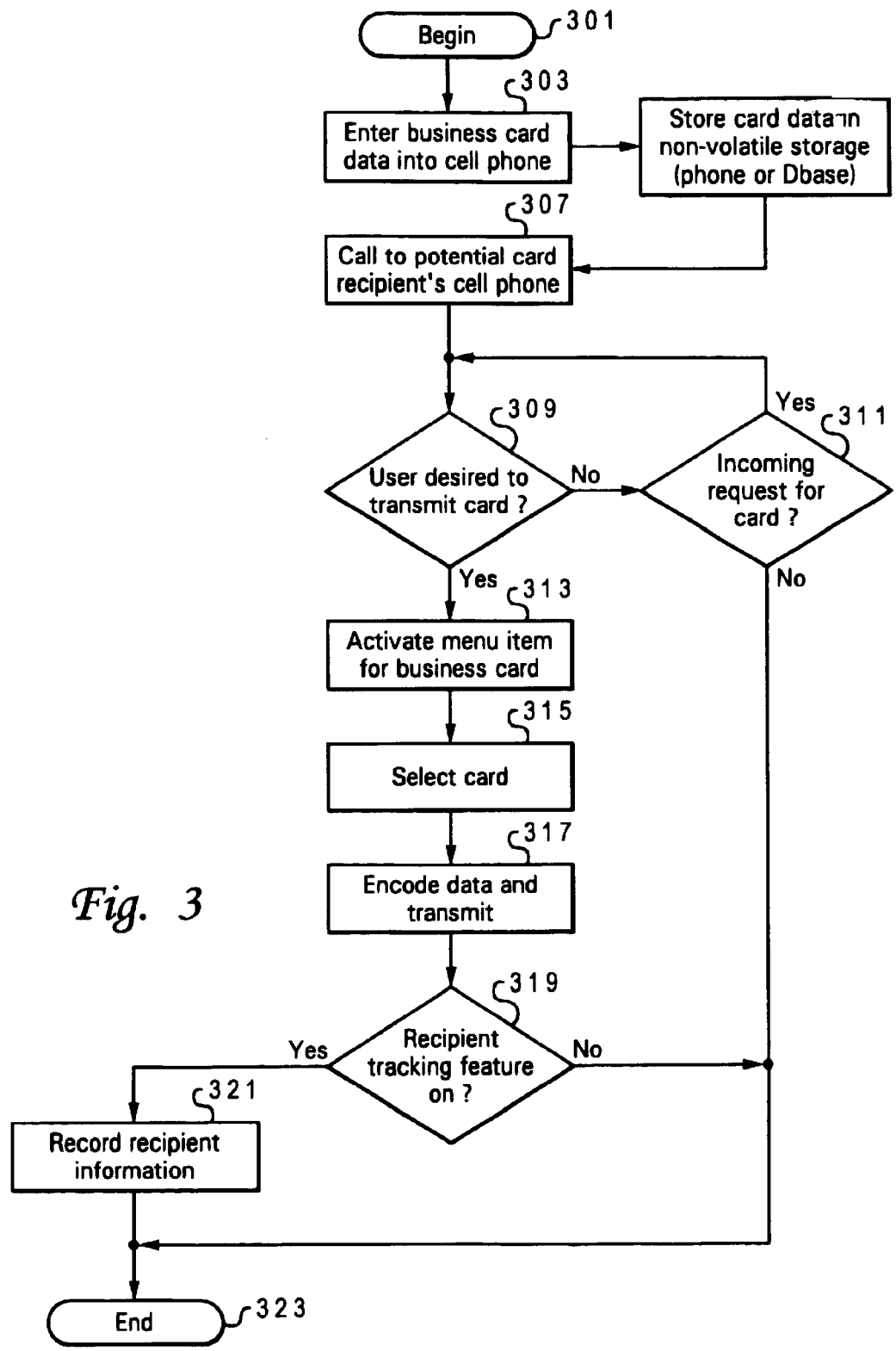
FIG. 3 is a high level flow chart of the process of entering business card data and transmitting the business card to a recipient in accordance with one embodiment of the present invention.

FIG. 3 illustrates a process by which the present invention may be implemented. The process begins at block 301, and thereafter, a user creates an electronic business card by inputting relevant data constituting the business card into the cellular phone as illustrated at block 303. In order to do this, the user first selects Business Card menu item (or option 4), then selects the appropriate menu function, i.e., item 3 illustrated in FIG. 4, using the alpha-numeric keys of keypad 140 or other function buttons of the cellular phone. The business card data is then stored as shown at block 305. In one embodiment, the business card data is stored in the non-volatile memory of the cell phone dedicated to storing business-card data. In another embodiment, the business card data is stored in a user-allocated storage location (i.e., mailbox) of a database provided by the service provider. With this second embodiment, the service provider allows the user to store up to a certain number of business cards, e.g., up to 1KB of data, remotely at the database to prevent the user having to store that much information in his cellular phone's memory, which may be utilized for other general information storage. Of course, the invention recognizes that with the improvements in silicon technology and logic design, storage of large number's of business cards in the memory of the cellular phone may not be as burdensome on the cellular phone's available memory. In another embodiment, the business card data can be downloaded into a contact list on a personal computer or a PDA.

Figure 5:
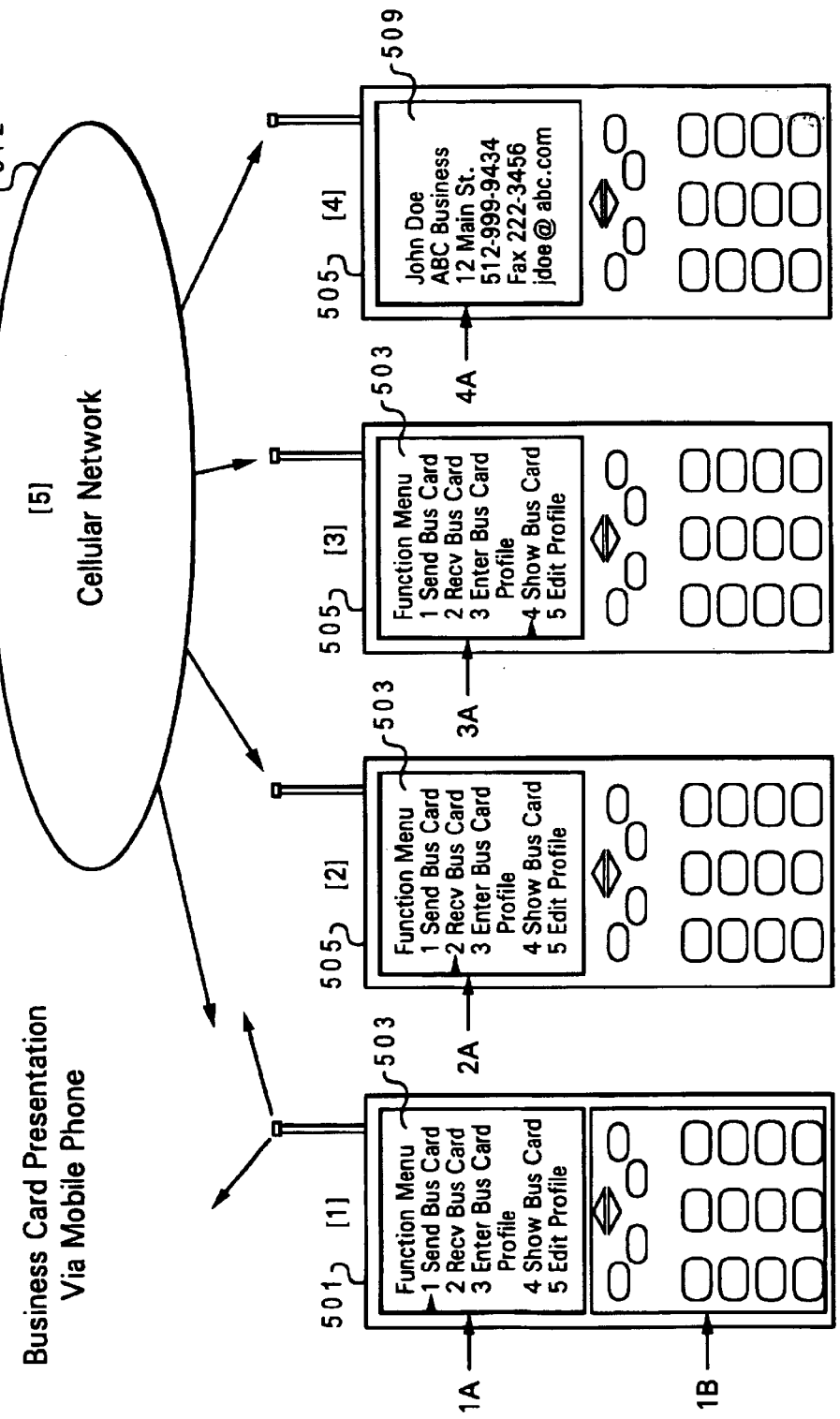
FIG. 5 depicts a series of menu options displayed on a cellular telephone by which the business card data may be entered and subsequently transmitted and stored in accordance with one embodiment of the present invention.

Once a business card has been stored into the cellular phone, the business card may be sent to a recipient's cell phone. Returning to FIG. 3, initiation of the transfer of the business card may be by the user or by the intended recipient. As illustrated in block 307, a call is initiated by either the user or the potential recipient. By monitoring selectable menu items, a determination is made at block 309, either before or during the call, whether the user desires to transmit a card to a recipient's cellular phone. The user may not consider transmitting a business card; however, the potential recipient may desire a card and transmit a verbal or electronic request for the business card as shown at block 311. If the user desires to transmit a business card or a request is received from the potential recipient for a business card, the user then activates an in-call menu item for the business card as shown at block 313. Function menu 503 of FIG. 5 illustrates one representative display of functions available to user once the user activates the in-call menu item. The user may then select the business card via option 4 of function menu 503 as shown in block 315. Selection of a business card is required when there are several different cards entered by the user or stored within the user's business card database. For example, the user may have several different versions of a business cards, several different businesses necessitating different cards, and/or other cards entered or received for other business contacts. Preferably, the user is able to select one business card to operate as a default business card, and any request for a business card, which is not preceded by a selection process from among the various available business cards, automatically provides the default business card.

Returning again to FIG. 3, following the selection of a business card, the user selects option 1 of function menu 503 to transmit the business card as shown at block 317. A determination is made at block 319, whether a tracking function is on, by which a list of all recipients of a user's business card is stored by the cellular phone. The stored list enables a user to track the persons with whom he has made contact and who have copies of his business cards. If the tracking feature is enabled, then the recipient information is recorded as shown at block 321. Then, the process ends as illustrated at block 323.

Figure 4:
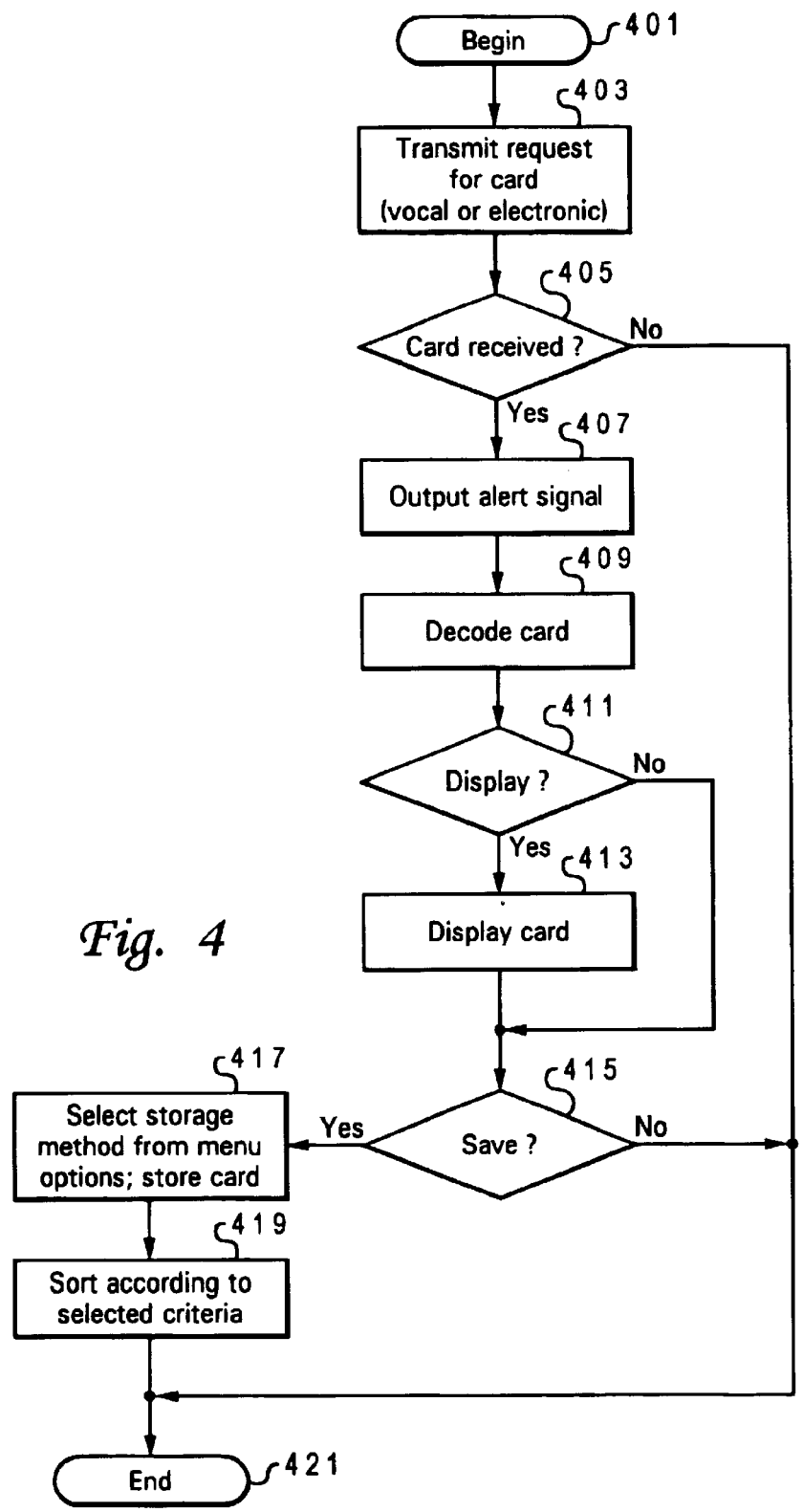
FIG. 4 is a high level flow chart of the recipient-side process for receiving and storing an electronic business card on a cellular telephone in accordance with one embodiment of the present invention.

To enable smooth transmission and receipt of the business card, the user of the cellular phone may first inform the recipient that he/she is sending his/her business card. As illustrated in FIG. 5, once the appropriate menu function, i.e., "1 send bus card", is activated, the cellular phone 501 encodes the stored business card data for transmission to the recipient's cellular phone 505 via the cellular network 512. FIG. 4 provides a flow chart of the process of receiving a transmitted business card on recipient's cellular phone 505. The process begins at block 401, and the recipient transmits a request for the user's business card as shown at block 403. The request may be vocal or electronic. During a call from or to the user's cellular phone, the recipient may request a receipt of the user's business card by selecting "2 Recv Bus Card" menu item, which transmits an electronic request for a business card to the user's cellular phone. Assuming the user's phone supports the business card feature, the user receives a prompt for the business card and selects the "1 Send Bus Card" menu item in response. This allows the transaction of sending the card to proceed in the background while the user and recipient continue their conversation. A determination is made at block 405 on the recipient's cellular phone 505 whether the user's business card has been received. In the preferred embodiment, upon receipt of the encoded business card data from the cellular network 512, the recipient's cellular phone 505 generates an audible tone as shown at block 407 to inform the recipient that a business card has been received. The received data is then decoded as shown at block 409 and the function menu simultaneously displayed with item "2 Recv Bus Card" pre-selected. The recipient is queried at block 411, whether he wishes to view the card, and may elect to view the card by selecting "4 Show Bus Card" function menu item, which provides the recipient with a display 509 of the business card, scaled to fit in display screen 180 as shown at block 413.

The recipient's menu selection is monitored and a determination made at block 415 whether the recipient wishes to save the business card. To save the business card the recipient selects the "OK" key 213 or utilizes other comparable method of selection. The user may then select the method of storage desired, and the business card data is stored in a non-volatile memory of the recipient's cellular phone 505 dedicated for storing business card data (or in provider's database) as provided at block 417. Following, the cell phone menu functions allow the user to sort the card among the various other cards according to user-defined criteria as illustrated at block 419. Then the process ends as shown at bock 421.

The invention thus allows the searching and sorting of stored business cards. Sorting the business cards allows a later data search to be performed based on either the contact's name or the business name, etc. Further, once a business card is displayed, a phone number shown on a business card can automatically be dialed by selection of the appropriate menu function. Also, an email address shown on the business card can be selected for transmitting an email utilizing email access functions available on the user's cellular phone.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of providing electronic business cards via a cellular phone, comprising:
   storing data of said business card as an electronic image in non-volatile storage;
   connecting a call between said cellular phone and a recipient cellular phone; and
   transmitting an electronic representation of said business card from said cellular phone to said recipient cellular phone during said call, wherein said electronic image of said business card is displayed on said recipient cell phone and wherein said transmitting step includes:
      initiating said transmitting step in response to a receipt of a request for said business card from the recipient cellular phone;
      selecting a menu function for transmitting said business card;
      when said card is stored at said network database, uploading said electronic image of said card to said cellular phoned;
      when a default business card has been identified by the user, transmitting said default business card to the recipient cellular telephone unless said user specifically selects a different one of multiple stored business cards to transmit; and
      when a tracking feature has been selected by said user, maintaining a record of each recipient of said business card.

2. The method of claim 1, further comprising:
   entering said data utilizing a keypad of said cellular phone and selectable menu items on said cellular phone; and
   selecting a layout of said data for viewable presentation as said business card, wherein a first layout scales said business card to fit in a display screen of said cellular telephone.

3. The method of claim 1, wherein said storing step comprises storing said data in non-volatile storage of said cellular phone, wherein said data includes at least one or more of a name, a business name, a phone number, an address, an email address, and a web address.

4. The method of claim 1, wherein said storing step comprises:
   storing said electronic image in a network database accessible to said cellular phone via a cellular network;
   retaining only relevant identifying data of said business card within a directory list of said cellular phone; and
   enabling upload of said electronic image to said cellular phone responsive to a selection of said relevant identifying data at said cellular phone, wherein said electronic image is displayed when said identifying data is selected by a user of said cellular phone.

5. The method of claim 1, further comprising:
   identifying a default business card among multiple business cards stored by said cellular phone, wherein a general selection of a business card on which to execute functions automatically selects said default business card.

6. The method of claim 1, wherein:
   said storing step includes arranging said business card among other stored business cards in an order based on user selected criteria for storing said business cards; and
   said selecting step further selects said business card from a plurality of available business cards stored in said non-volatile memory.

7. The method of claim 6, further comprising:
   establishing a call between said cellular phone and a second cellular phone; and
   receiving business card data from said second cellular phone;
   outputting a signal to alert the user of the receipt of said business card data;
   displaying an electronic image of said business card; and
   enabling said user to store said business card for future access, wherein relevant communication data is stored in a format that enables said user to later initiate a call and send an email without physically entering the telephone number or email address of the contact identified by said business card.

8. A method of providing electronic business cards via a cellular phone comprising:
   storing data of said business card as an electronic image in non-volatile storage;
   connecting a call between said cellular phone and a recipient cellular phone; and
   transmitting an electronic representation of said business card from said cellular phone to said recipient cellular phone during said call, wherein said electronic image of said business card is displayed on said recipient cell phone;
   enabling voice activation of a call to a business contact by a user voicing "call" while said electronic image of said business card is being displayed; and
   enabling voice activation of a transmission of a business card by a user voicing "send" while said electronic image of said business card is being displayed.

9. A cellular telephone comprising:
   a processor and associated non-volatile memory;
   a display device; and
   program code executed by said processor, comprising code for:
      storing business card information as an electronic image in said associated non-volatile memory;
      transmitting an electronic representation of said business card information from said cellular phone to said recipient cellular phone responsive to a user selection of a business card transmit menu function during a call to the recipient cellular phone, wherein said electronic image of said business card is displayed on said recipient cell phone;

enabling voice activation of a call to a business contact by a user voicing "call" while said electronic image of said business card is being displayed; and enabling voice activation of a transmission of a business card by a user voicing "send" while said electronic image of said business card is being displayed.

10. The cellular telephone of claim 9, further comprising program code for:

enabling and displaying a plurality of menu functions for (1) input of said business card information, (2) storing said business card information, and (3) subsequent transmission and manipulation of said business card information.

11. The cellular telephone of claim 10, wherein said program code for inputting business card information includes code for:

prompting a user for said business card information responsive to a selection of a menu function for entry of said business card information; and displaying said business card information in a business card format on said display device.

12. The cellular telephone of claim 11, wherein said transmitting program code includes code for:

initiating said transmitting step in response to receipt of a request for said business card from the recipient cellular phone;

selecting a menu function for transmitting said business card;

when said card is stored at said network database, uploading said electronic image of said card to said cellular phone; and when a default business card has been identified by the user, transmitting said default business card to the recipient cellular telephone unless said user specifically selects a different one of multiple stored business cards to transmit;

when a tracking feature has been selected by said user, maintaining a record of each recipient of said business card.

13. The cellular telephone of claim 11, wherein said displaying program code includes code for scaling said business card information to fit within said display device prior displaying said business card.

14. The cellular telephone of claim 9, further comprising program code for:

establishing a call between said cellular phone and a second cellular phone; and receiving business card data from said second cellular phone;

outputting a signal to alert the user of the receipt of said business card data;

displaying an electronic image of said business card; and enabling said user to store said business card for future access, wherein relevant communication data is stored in a format that enables said user to later initiate a call and send an email without physically entering the telephone number or email address of the contact identified by said business card.

15. The cellular telephone of claim 12, wherein:

said storing step includes arranging said business card among other stored business cards in an order based on user selected criteria for storing said business cards; and said selecting step further selects said business card from a plurality of available business cards stored in said non-volatile memory.

16. The cellular phone of claim 15, further comprising program code for:

sorting said business card among a plurality of business cards stored in said non-volatile storage according to user-selected sorting criteria;

outputting an alert signal when said business card information is received from said cellular network; and identifying a default business card among multiple business cards stored by said cellular phone, wherein a general selection of a business card on which to execute functions automatically selects said default business card.

17. The cellular phone of claim 14, further comprising program code for:

linking a stored phone number to a visual display of said business card; and automatically dialing the phone number of a business card that is being displayed on said cellular phone in response to a user selection of a talk function of said cellular phone, while said business card image is being displayed.

18. The cellular phone of claim 17, further comprising program code and logic for:

linking a stored email address to a visual display of said business card;

automatically creating an email shell for transmission of an email to an email address on a business card currently being displayed on said cellular, phone in response to a user selection of an email function of said cellular phone; and transmitting said email to a recipient identified by said business card being displayed.

19. The cellular phone of claim 18, further comprising program code for:

storing said electronic image of said business card in a mailbox located at a network database accessible to said cellular phone via a cellular network;

storing a contact link of said business card data in non-volatile memory of said cellular phone, wherein selection of said contact link dynamically links said cellular phone to said mailbox and uploads said business card data into said cellular phone;

retaining only relevant identifying data of said business card within a directory list of said cellular phone; and enabling upload of said electronic image to said cellular phone responsive to a selection of said relevant identifying data at said cellular phone, wherein said electronic image is displayed when said identifying data is selected by a user of said cellular phone.

20. A cellular phone system that enables transmission of electronic business cards, comprising:

a network for connecting wireless calls and transmitting data from one cellular phone unit to another;

a recipient's cellular phone, capable of receiving calls and data from said network; and a sender's cellular phone that includes' program code for storing and transmitting business card data via said network to said recipient's cellular phone, wherein said program code transmits said business card data responsive to a user selecting a transmit function on said sender's cellular phone during a call to said recipient's cellular phone; said program code further comprising code for:

storing data of said business card as an electronic image in non-volatile storage;

connecting a call between said cellular phone and a recipient cellular phone; and transmitting an electronic representation of said business card from said cellular phone to said recipient cellular phone during said call, wherein said electronic image of said business card is displayed on said recipient cell phone;

wherein both said recipient's and sender's cellular phone further comprises program code for;

linking a corresponding telephone number to a display of said business card;

automatically dialing a telephone number on a displayed business card in response to user-selection of a talk connection feature while said business card is behind displayed;

enabling voice activation of a call to a business contact by a user voicing "call" while said electronic image of said business card is being displayed; and enable voice activation of a transmission of a business card by a user voicing "send" while said electronic image of said business card is being displayed.

21. The cellular phone system of claim 20, wherein said storing program code further comprising code for selecting a layout of said data for viewable presentation as said business card, wherein a first layout scales said business card to fit in a display screen of said cellular phone.

22. The cellular phone system of claim 21, wherein said sender's cellular phone further includes program code for displaying selectable menu items for entering data of said business card via a keypad of said sender's cellular phone, wherein said data includes at least one or more of a name, a business name, a phone number, an address, an email address, and a web address.

23. The cellular phone system of claim 22, wherein said sender's cellular phone further comprises program code for:

sorting a business card from among various other business cards within said non-volatile storage in an order based on a user selected criteria for storing said business cards; and selecting a default business card from among multiple business cards stored by said cellular phone, wherein a general selection of a business card on which to execute functions automatically selects said default business card.

24. The cellular phone system of claim 23, wherein: said recipient's cellular phone further comprises program code for:

receiving said business card;

displaying said business card;

outputting a signal to alert the user of the receipt of said business card data;

displaying an electronic image of said business card; and enabling said user to store said business card for future access, wherein relevant communication data is stored in a format that enables said user to later initiate a call and send an email without physically entering the telephone number or email address of the contact identified by said business card.

25. The cellular phone system of claim 24, wherein said program code further comprising code for:

storing said electronic image in a network database accessible to said cellular phone via a cellular network;

retaining only relevant identifying data of said business card within a directory list of said cellular phone; and enabling upload of said electronic image to said cellular phone responsive to a selection of said relevant identifying data at said cellular phone, wherein said electronic image is displayed when said identifying data is selected by a user of said cellular phone.

26. The cellular phone system of claim 20, wherein both said recipient's and sender's cellular phone further comprises program code for:

linking an email address to a display of said business card;

automatically opening an email message to an email address on a displayed business card in response to user-selection of an email connection feature.

27. The cellular phone system of claims 25, wherein said sender's cellular phones further comprises program code for:

initiating said transmitting step in response to a receipt of a request for said business card from the recipient cellular phone;

selecting a menu function for transmitting said business card;

when said card is stored at said network database, uploading said electronic image of said card to said cellular phone;

when a default business card has been identified by the user, transmitting said default business card to the recipient cellular telephone unless said user specifically selects a different one of multiple stored business cards to transmit; and when a tracking feature has been selected by said user, maintaining a record of each recipient of said business card.

* * * * *

UNITED STATES PATENT AND TRADEMARK OFFICE
CERTIFICATE OF CORRECTION

PATENT NO. : 6,873,861 B2
DATED : March 29, 2005
INVENTOR(S) : Faisal M. Awada et al.

It is certified that error appears in the above-identified patent and that said Letters Patent is hereby corrected as shown below:

Column 7,
Line 40, delete "phoned" and insert -- phone --.

Column 10,
Line 28, delete "cellular, phone" and insert -- cellular phone --.
Line 62, delete "phone; said" and insert -- phone, said --.

Column 11,
Line 9, "for;" should be -- for: --.
Line 14, "behind" should be -- being --.

Signed and Sealed this

Sixth Day of June, 2006

JON W. DUDAS
*Director of the United States Patent and Trademark Office*